US008305596B2

(12) United States Patent
Hamada

(10) Patent No.: US 8,305,596 B2
(45) Date of Patent: Nov. 6, 2012

(54) INFORMATION PROCESSING APPARATUS, INFORMATION PROCESSING METHOD, PROGRAM, AND STORAGE MEDIUM

(75) Inventor: Noboru Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1115 days.

(21) Appl. No.: 11/329,032

(22) Filed: Jan. 11, 2006

(65) Prior Publication Data

US 2006/0158676 A1     Jul. 20, 2006

(30) Foreign Application Priority Data

Jan. 17, 2005  (JP) ................................. 2005-009237
Dec. 22, 2005  (JP) ................................. 2005-370899

(51) Int. Cl.
*G06K 15/00* (2006.01)
*G06F 3/12* (2006.01)
*G06F 1/00* (2006.01)

(52) U.S. Cl. ........................ 358/1.14; 358/1.15; 713/300

(58) Field of Classification Search ........................ None
See application file for complete search history.

(56) References Cited

U.S. PATENT DOCUMENTS

| 7,454,796 | B2 * | 11/2008 | Mazzagatte et al. | ............ | 726/28 |
| 2002/0083114 | A1 * | 6/2002 | Mazzagatte et al. | .......... | 709/100 |
| 2004/0125402 | A1 * | 7/2004 | Kanai et al. | .................. | 358/1.15 |
| 2004/0128532 | A1 | 7/2004 | Ohishi et al. | | |
| 2004/0179220 | A1 | 9/2004 | Van Oosterhout | ........... | 358/1.13 |
| 2006/0158676 | A1 * | 7/2006 | Hamada | ....................... | 358/1.14 |

FOREIGN PATENT DOCUMENTS

| JP | 2003-330886 | 11/2003 |
| JP | 2004-088614 | 3/2004 |
| JP | 2004-129247 A | 4/2004 |
| JP | 2004-152263 | 5/2004 |

OTHER PUBLICATIONS

Nov. 28, 2008 Chinese Official Action in Chinese Patent Appln. No. 200610001045.6 (with translation).

* cited by examiner

*Primary Examiner* — Thomas Lett
*Assistant Examiner* — Marcus T Riley
(74) *Attorney, Agent, or Firm* — Fitzpatrick, Cella, Harper & Scinto

(57) ABSTRACT

An object of this invention is to provide an information processing apparatus which can provide a plurality of services via a network, can easily manage objects to be processed which are permitted to be processed by the service, and enhances security for respective objects to be processed. To this end, an MFP according to this embodiment is an MFP (100) which can provide a plurality of services (306 to 308), and has a read unit for accessing a script (305) that describes information associated with a document file and reading the information, a unit (302) for, when a request is received, instructing to execute authentication processing of a user who issued the request, and a unit (301) for, when the user authentication has succeeded, checking based on the information whether or not a file included in the request is a file which is not permitted to be processed by the service. If it is determined that the file is permitted to be processed by the service, the service processes the file.

10 Claims, 9 Drawing Sheets

FIG. 5

```
1 : <print-policy>
2 :   <default>enable</default>
3 :   <disable-list>
4 :     <item>"project ¥ DIVISION CHIEF MEETING"</item>
5 :     <item>"section ¥ 1106"</item>
6 :   </disable-list>
7 : </print-policy>
```

INFORMATION PROCESSING APPARATUS, INFORMATION PROCESSING METHOD, PROGRAM, AND STORAGE MEDIUM

FIELD OF THE INVENTION

The present invention relates to an information processing technique in an information processing apparatus which can provide a plurality of services via a network.

BACKGROUND OF THE INVENTION

As one of methods for efficiently executing processing that takes much time and processing that requires high cost, a method of executing processing by a server computer (to be referred to as "server" hereinafter) in a concentrated manner is known. Such method is well known as a client-server system.

In general, in the client-server system, servers are considered as resources, and servers which can be used by a client computer (to be referred to as "client" hereinafter) are limited via user authentication using, e.g., a password or the like.

Under such circumstances, the client stores the IDs and passwords of a plurality of servers, and each user must input his or her ID and password every time he or she accesses each server.

By contrast, there is disclosed so-called SSO (Single Sign-on) in which a "node" is arranged between services provided by the servers and the client that requests these services, and that node alternately executes user authentication in an integrated fashion. Such technique is disclosed in, e.g., Japanese Patent Laid-Open No. 2003-330886.

FIG. 9 is a conceptual diagram for explaining the function which is disclosed in Japanese Patent Laid-Open No. 2003-330886, and alternately executes user authentication in an integrated fashion. A client-server system shown in FIG. 9 has a node 904 between web servers 905 to 907 and clients 901 and 902, and is configured so that the node 904 can provide a plurality of services to the clients via a network 903.

With such configuration, according to Japanese Patent Laid-Open No. 2003-330886, the node 904 which received a service request from the client 901 or 902 simulates the operations of the web servers 905 to 907. Upon completion of SSO (Single Sign-on), the node 904 transfers the request of the web service to the web server (one of 905 to 907) which provides the requested web service. As a result, the user can receive a desired web service from the web server as the transfer destination. When the user wants to access another web server later, he or she need not input any ID or password, thus improving operability.

In this manner, the node is arranged between the clients and servers, and alternately executes user authentication in an integrated fashion, thus improving the operability in user authentication. On the other hand, enhancement of security for document files to be processed by such system is demanded.

Hence, as an example of the aforementioned client-server system, an MFP (Multi Function Peripheral) which can provide services or web services such as a print service, scan service, and FAX service will be exemplified. A client-server system in which a client is connected to that MFP to communicate with each other will be exemplified, and an aspect of the security function in this system will be examined.

In such client-server system, upon opening a document file on the client and printing out that document file using a print service provided by a print server in the MFP, security is normally guaranteed by executing the following authentication processing.

Upon opening the document file on the client, since it is requested to input a password and the like, it is authenticated whether or not the user of interest has "file use authority" required to use the document file on the client.

Furthermore, when the print service of the MFP is used via the client, user authentication as to whether or not the user of interest has the use authority of the print service ("print service use authority") is made. In this way, by confirming if the user of interest has the use authority on both the client and MFP sides, document files can be inhibited from being accessed or printed out readily.

However, it is sometimes demanded to permit access to a specific document file on the client (to grant the file use authority to the user), but not to permit printing out using the print service.

Such case can be coped with by limiting the print service use authority of the user. However, the user whose use authority cannot receive the print service even for document files (those which are permitted to be printed out) other than the specific document file. Contrary to this, the user can print out document files which are not permitted to be printed out as long as he or she has the use authority of the print service. Hence, the security for respective documents cannot be coped with by limiting the use authority of the print service.

To solve such problems, in the aforementioned client-server system, the following ones of a plurality of document files which are opened on the client are preferably separately handled. The first document file is the one which can be printed out using the print service if the user can use the print service provided by the MFP (such document file will be referred to as a "document file with a print authority" hereinafter). The second document file is the one which is inhibited from being printed out using the print service even by the user who has the use authority of the print service (such document file will be referred to as a "document file without a print authority" hereinafter).

However, it is not easy to manage the print authority, which are not limited by a normal OS, for respective document files, and to consistently control the client-server system without contradiction.

For example, the following means may be proposed as one of means for implementing such function. That is, a program of the print service provided by the MFP may be modified to be able to check on the basis of a print service request whether or not the requested document file is the one with the print authority. However, in order to manage the print authority for respective document files, every time a document file without a print authority is added, the program of the existing print service must be modified, thus requiring huge man-hours.

Also, for example, as another means for implementing such function, an agent may be provided to the client, and may manage the presence/absence of the print authority. Note that the agent is a module for checking if the document file is the one with the print authority upon using the print service provided by the MFP, and can be implemented by a method such as an API hook or the like. However, with such method, when the agent effects the API hook, applications which can control the print authority for respective document files are limited to a specific application which is determined in advance and is intended by the agent.

Under such circumstances, in the aforementioned client-server system, it is demanded to manage the presence/absence of the print authority for respective document files by a simple operation.

SUMMARY OF THE INVENTION

The present invention has been made in consideration of the above situation, and has as its object to provide an information processing apparatus which can provide a plurality of services via a network, can easily manage objects to be processed which are permitted to be processed by the service, and enhances security for respective objects to be processed.

In order to achieve the above object, an information processing apparatus comprises the following arrangement. That is, an information processing apparatus which can provide a plurality of services, comprising:

read unit configured to access holding unit which holds information associated with a document file, and reading the information;

instruction unit configured to, when a request to process a document file using the service is received, instructing to execute authentication processing of a user who issued the request; and checking unit configured to check based on the information read by the read unit whether or not the document file requested to be processed using the service is a document file which is permitted to be processed by the service, and wherein in case where the checking unit determines that the document file is permitted to be processed by the service, and authentication has succeeded as a result of the authentication processing of the user, the service processes the document file.

According to the present invention, an information processing apparatus, which can provide a plurality of services via a network, can easily manage objects to be processed which are permitted to be processed by the service, and can enhance security for respective objects to be processed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows a description example of an XML script 305;

DETAILED DESCRIPTION OF THE PREFERRED EMBODIMENTS

Preferred embodiments of the present invention will now be described in detail in accordance with the accompanying drawings.

[First Embodiment]

<Arrangement of MFP>

Figure 1:
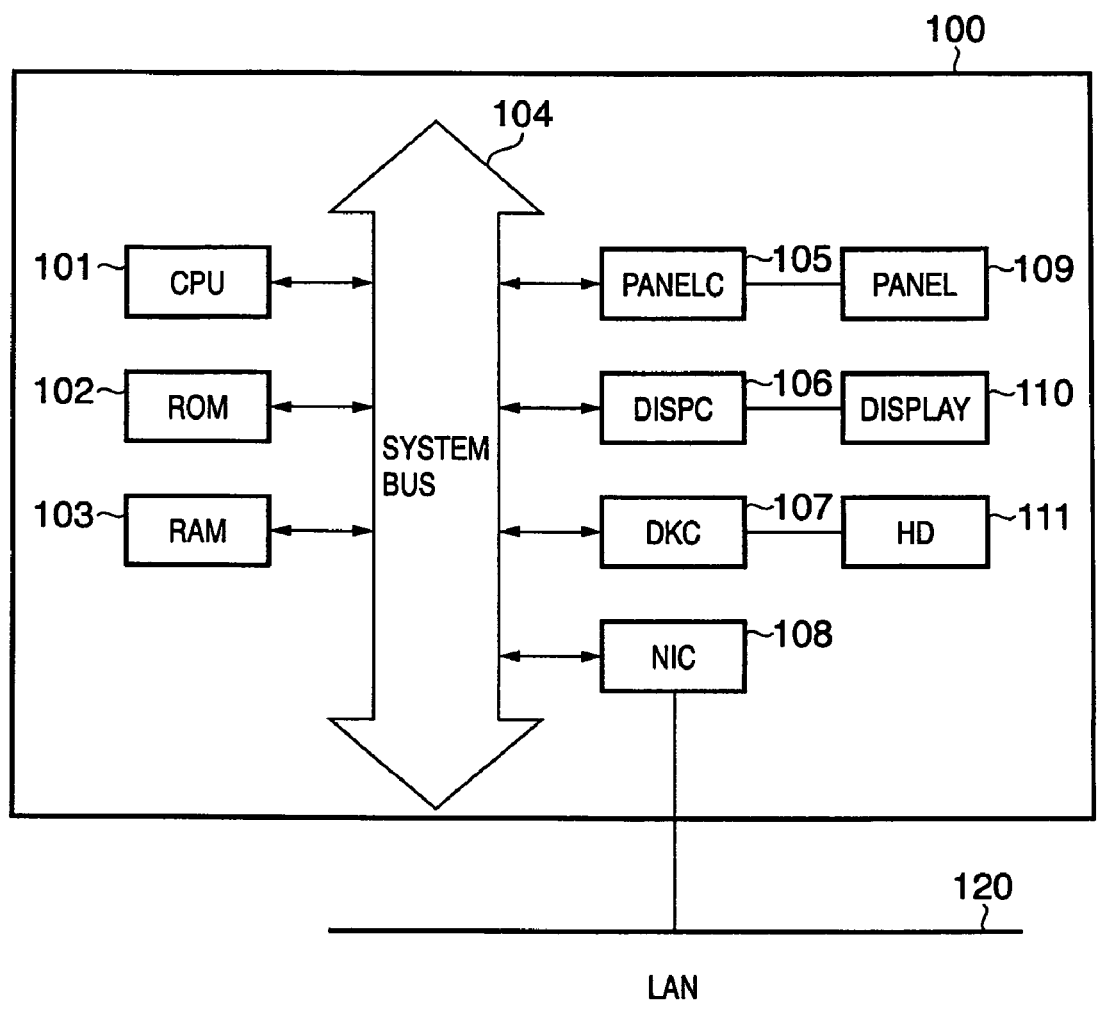
FIG. 1 is a block diagram showing the arrangement of an information processing apparatus according to the first embodiment of the present invention.

FIG. 1 is a block diagram showing the arrangement of an information processing apparatus according to the first embodiment of the present invention. In this embodiment, a Multi Function Peripheral (to be simply referred to as an "MFP" hereinafter) 100 which comprises server functions that can provide various web services will be exemplified as the information processing apparatus. However, the present invention is not particularly limited to this.

As shown in FIG. 1, the MFP 100 comprises a CPU 101 which executes software stored in a ROM 102 or a large-capacity storage device 111 such as a hard disk or the like, and systematically controls devices connected to a system bus 104.

Reference numeral 103 denotes a RAM which serves as a main memory, work area, and the like of the CPU 101. Reference numeral 105 denotes an external input controller (PANELC) which controls instruction inputs from various buttons, a touch panel 109, or the like. Reference numeral 106 denotes a display controller (DISPC) which controls display of a display module (DISPLAY) 110 comprising, e.g., a liquid crystal display or the like. A disk controller 107 controls access to the hard disk 111.

Reference numeral 108 denotes a network interface card (NIC) which exchanges data with another network device, file server, and the like via a LAN 120.

Note that the MFP 100 includes a scanner unit for scanning prints and a printer unit for outputting the prints in addition to the aforementioned modules or components, as will be understood. However, since these units are not directly related to the present invention, they are not illustrated.

<Arrangement of Client-Server System>

Figure 2:
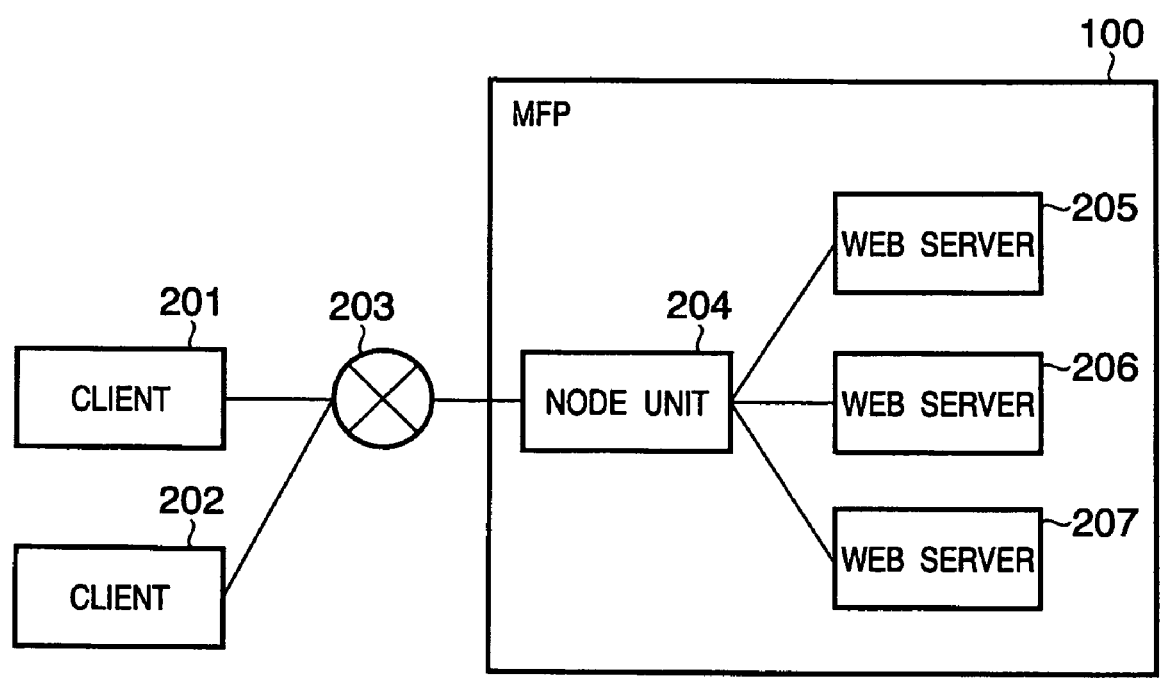
FIG. 2 is a block diagram showing the arrangement of a client-server system implemented by connecting an MFP 100 which comprises server functions that can provide various web services, and clients 201 and 202 via a network 203 to be able to communicate with each other.

FIG. 2 is a block diagram showing the arrangement of a client-server system implemented by connecting the MFP 100 which comprises server functions that can provide various web services, and clients 201 and 202 via a network 203 to be able to communicate with each other.

Also, FIG. 2 shows the functional block diagram of the internal arrangement of the MFP 100 in association with functions of providing various web services. As shown in FIG. 2, web servers 205 to 207 which provide web services are connected to a node unit 204. Each of these web servers works on the basis of a service request received from the client 201 or 202 via the network 203, and provides a web service. As examples of services provided by any of the web servers 205 to 207, a print service for printing a document, and a scan service for generating image data by scanning a document are available. Also, as other examples of services, a transmission service for transmitting image data to an external terminal at a predetermined destination, a storage service for storing/reading out image data in/from the hard disk 111, and the like are available. In addition, any of the web servers 205 to 207 of the MFP 100 may provide functions utilizing the hardware resources of the MFP as services. The number of web servers of the MFP 100 is not limited to three (web servers 205 to 207). A function which is implemented by combining sole services provided by these web servers may be considered as one service.

<Authentication of Access Authority in MFP>

The authentication processing of the access authority of each web service in the MFP 100 will be described below using FIGS. 3 and 4. Note that the access authority of each web service is the authority to make each web service execute processing of a predetermined document file. This authority is determined based on a result of "user authentication" for confirming if the operator is a user who can use the web service, and a result of "document file confirmation" for confirming if a document file is permitted to be processed by the web service.

If the web service is a print service, the access authority of the print service is the authority to make the print service execute print processing of a document file. More specifically, this authority is determined based on the following two results. The first result is a result of user authentication required to confirm whether or not the user can use the print service. The second result is a result of confirmation as to whether or not a document file is permitted to undergo print processing by the print service (a document file with a print authority).

If both the user authentication result and document file confirmation result are "OK", it is authenticated that the user has the access authority to the web service, and the web service executes processing of the document file. This processing will be described in detail below using FIGS. 3 and 4.

Figure 3:
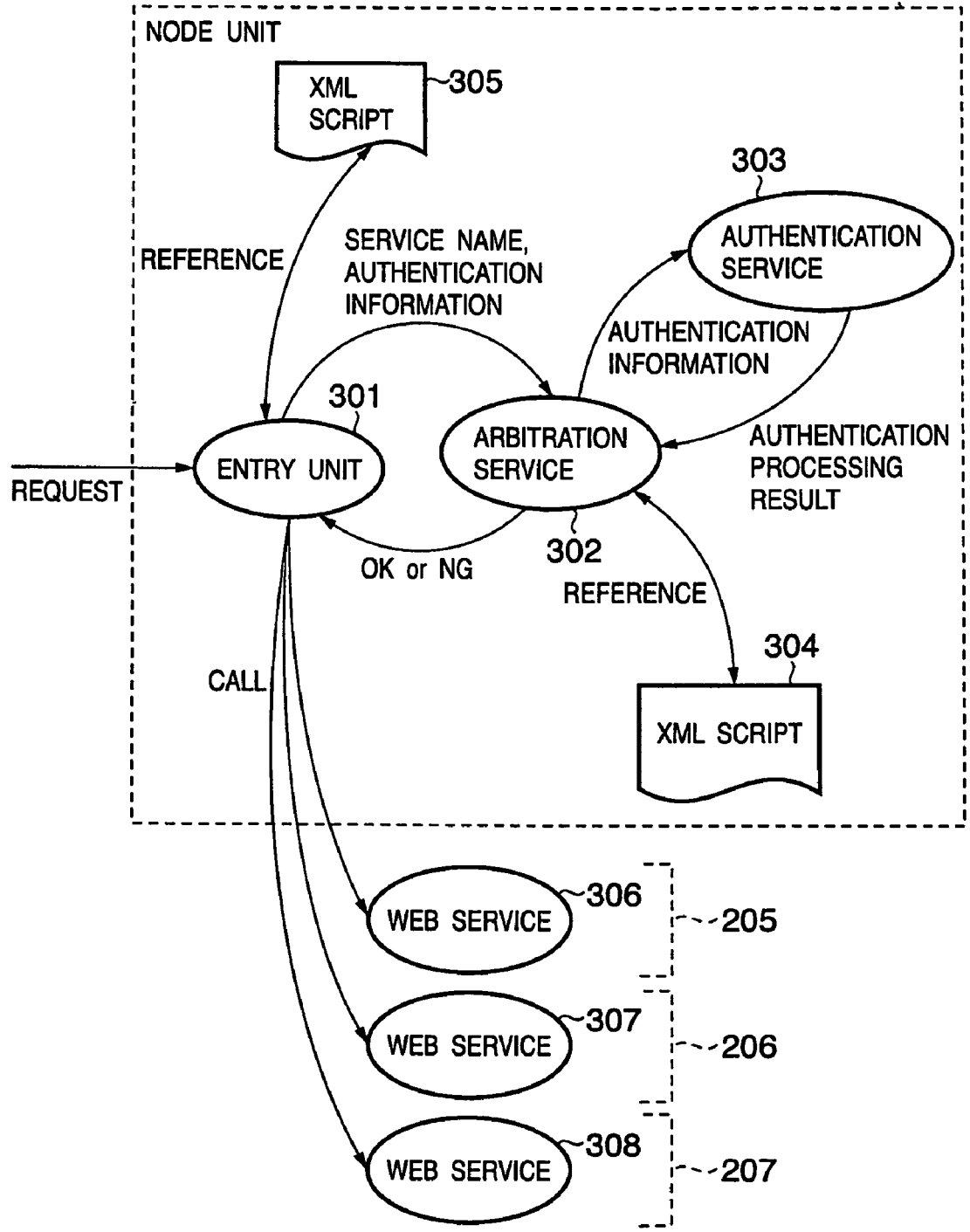
FIG. 3 is a model chart showing the flow of processing upon reception of a request by the MFP 100.
Figure 4:
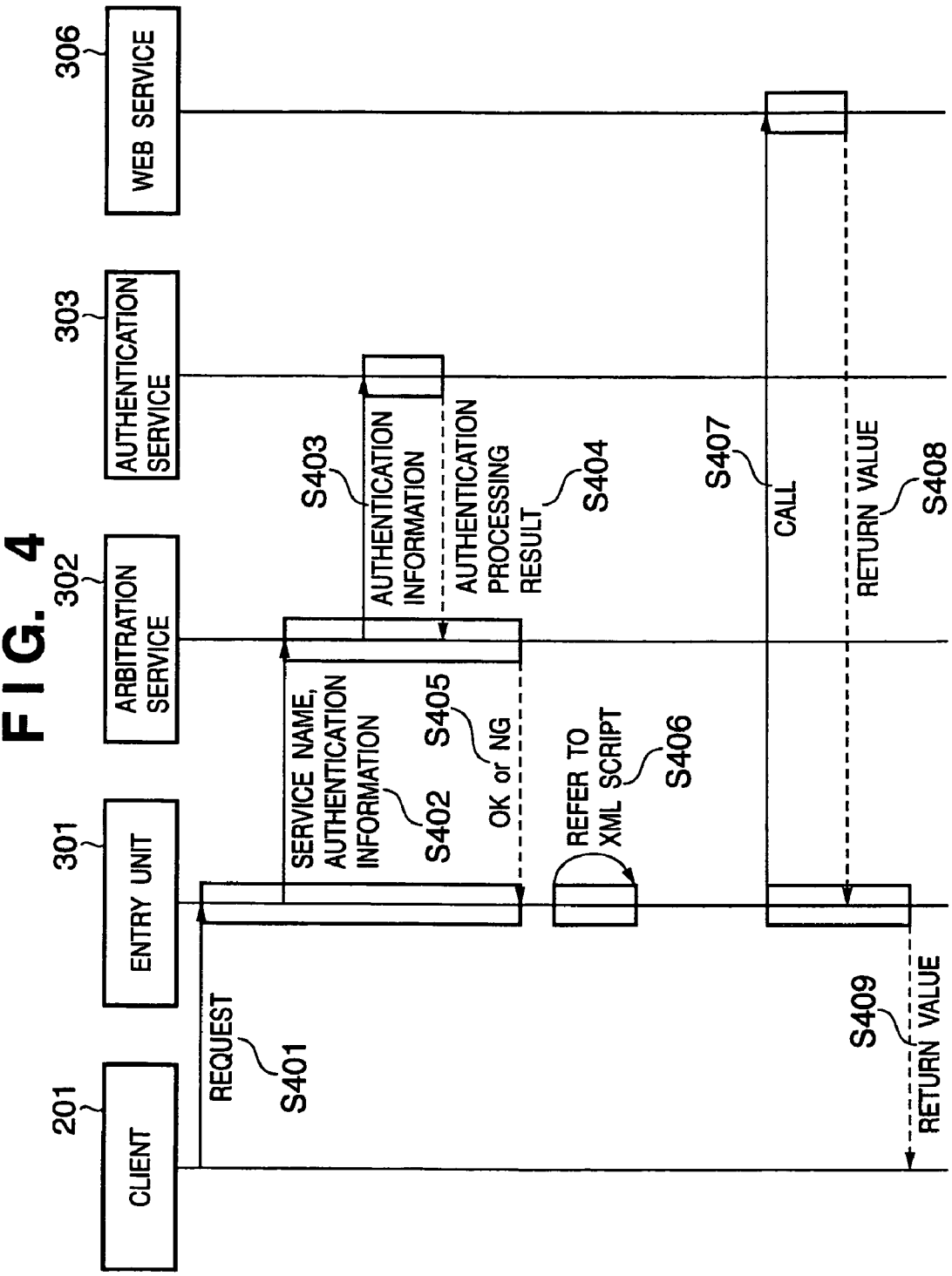
FIG. 4 is a chart showing the flow of the processes of the respective units in the model chart shown in FIG. 3.

FIG. 3 is a model chart showing the flow of processing upon reception of a request by the MFP 100. FIG. 4 is a chart showing the flow of the processes of respective units in the model chart.

As shown in FIG. 3, as functions of processing the received request, the node unit 204 comprises an entry unit 301, arbitration service 302, and authentication service 303. Furthermore, the node unit 204 comprises an XML script 304 which describes information that pertains to authentication services associated with the web services, and an XML script 305 which describes document files that are not permitted to be processed by the web services.

Upon reception of a processing request for the web service from the client 201 (step S401), the entry unit 301 notifies the arbitration service 302 of the service name of the request destination and authentication information (step S402).

The arbitration service 302 refers to the XML script 304 to acquire information associated with an authentication service associated with the requested web service. Note that FIG. 3 illustrates only one authentication service. However, a plurality of authentication services are prepared in practice, and one of these services is selected on the basis of the reference result of the XML script 304.

The arbitration service 302 notifies the corresponding authentication service 303 of the authentication information received from the entry unit 301 on the basis of the acquired information associated with the authentication service (step S403).

The authentication processing result by the authentication service 303 is sent back to the arbitration service 302 (step S404), and the arbitration service 302 sends back the authentication processing result to the entry unit 301 (step S405).

The entry unit 301 checks with reference to the XML script 305 if the object to be processed (document file) included in the request transmitted by the user (in this case, the user who has been authorized by user authentication) is a document file which is permitted to be processed by the web service (a document file with a print authority if the web service is the print service) (step S406).

More specifically, a header field of an entity file of the object to be processed included in a request packet from the client 201 is interpreted to acquire the file name (attribute information) of the entity file. The acquired attribute information is interpreted to determine with reference to the XML script 305 whether or not the entity file of interest is a file which is permitted to be processed by the requested web service. Note that FIG. 5 shows an example of the XML script 305, which will be described in detail later.

The entry unit 301 calls the requested web service or sends, to the request source, a message indicating that execution of the web service is denied on the basis of the checking result as to whether or not the document file is permitted to be processed by the web service.

That is, if the user is authorized as a user who can use the web service as a result of the authentication processing by the authentication service 303, and if it is determined as the reference result of the XML script 305 by the entry unit 301 that the document file is permitted to be processed by the web service, the entry unit 301 calls the requested web service (step S407).

The processing result of the web service is returned in the form of a return value to the entry unit 301 (step S408), and is then returned to the client 201 as a return value of the function call (step S409).

If the authentication result in step S405 is NG, the process in step S406 may be skipped, and a message indicating that execution of the web service is rejected may be sent to the request source.

Prior to the processes in steps S402 to S405, the process in step S406 may be executed. Furthermore, if it is determined with reference to the XML script 305 in step S406 that execution of the print service is not permitted, the processes in steps S402 to S405 may be skipped. In this case, a message indicating that execution of the web service is rejected is sent to the request source.

<Description of Script 305>

FIG. 5 shows a description example of the XML script 305. The script shown in FIG. 5 is described in the XML format.

In FIG. 5, the first line indicates a description about "print authority". This "print authority" is not supported by a normal OS. The second line indicates that print processing is enabled as a default authority in association with the print authority. The third line declares that items whose print authority is to be disabled are listed in this line and subsequent lines. The fourth and fifth lines indicate that print processing of files described in these line is not permitted unless a special authority is granted. The sixth and seventh lines respectively indicate end tags which close the start tags in the third and first lines in the XML description.

In this manner, the XML script describes a description about the print authority, and file names without a print authority. Before the entry unit 301 calls the print service, it checks with reference to this XML script if a document file is permitted to be processed by the print service. Even when a document file without a print authority is to be added, the XML script 305 need only be rewritten, and document files without a print authority can be easily managed. Also, as for the print authority, the entry unit 301 alone can centrally control the policy of the entire MFP.

The XML script 305 in FIG. 5 may adopt a description method that permits/inhibits execution of services for each user. For example, such description method can be implemented as follows. That is, the fourth line of FIG. 5 indicates a document whose print processing is inhibited. This line can also describe a user name whose print processing is permitted. Alternatively, a tag indicating a user whose print processing of a given document is permitted may be added. In this manner, a policy which permits only a specific user to execute a service of a given document file can be given.

The XML script in FIG. 5 indicates an example of a destination associated with the authority of processing (e.g., print) for a document file. However, the present invention is not limited to a document file. The XML file may describe the authority associated with arbitrary processing for other resources. For example, the XML script may describe the authority of execution or installation of software.

<Practical Example of Request>

Figure 6:
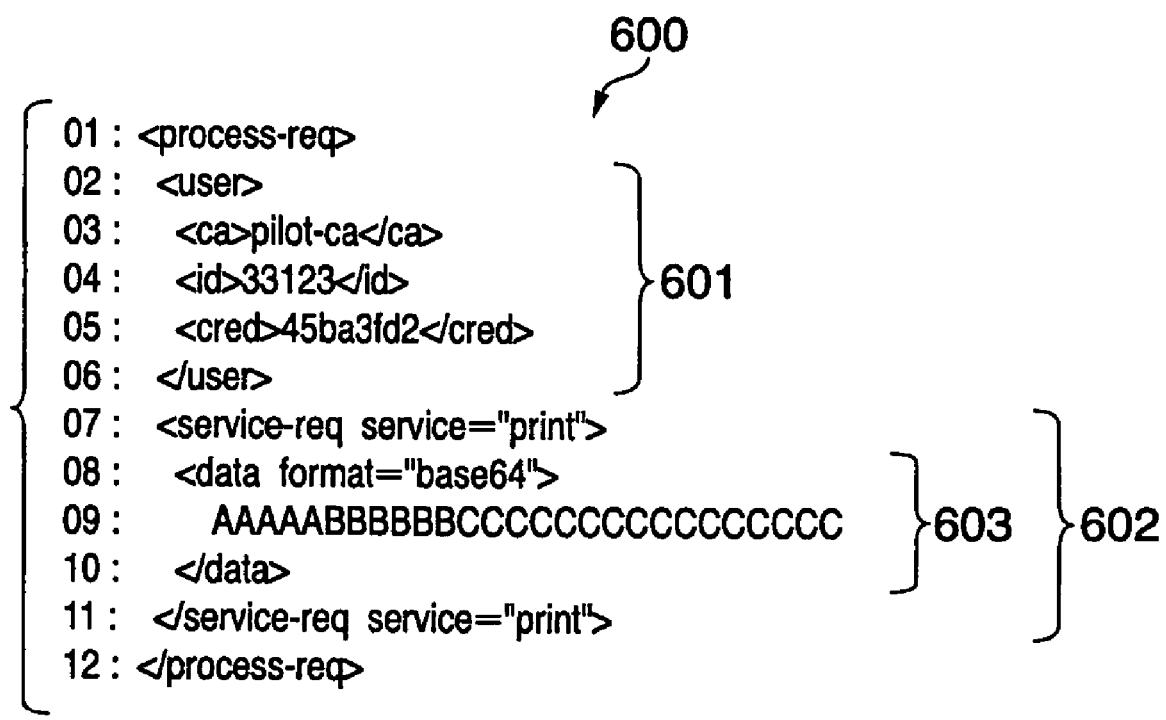
FIG. 6 shows an example of a request.

The contents of a service execution request (to be simply referred to as a request hereinafter) which is transmitted from the client 201 or 202 to the MFP 100 via the network 203 will be described below. FIG. 6 shows an example of a request.

In a request 600, reference numeral 601 denotes user's authentication information. Reference numeral 602 denotes request contents of processing. In this case, it is requested to print a document file using the print service. Reference numeral 603 denotes real data of an object to be printed (object to be processed).

As can be seen from the above description, according to this embodiment, upon reception of a request of the web service, the entry unit 301 authorizes whether or not a document file to be processed upon using the web service is a document file with a print authority. In this manner, the security for each document file can be enhanced.

Upon authenticating the document file, the XML script 305 which can be referred to by the entry unit 301 is provided, and collectively describes document files which are not permitted to be processed by the web service. In this way, document files which are not permitted to be processed by the web service can be easily added/deleted, and can be easily managed.

The MFP side checks based on the description of the header field of an entity file included in a request packet received by the MFP 100 whether or not the document file is permitted to be processed by the web service. In this way, all document files to be received by the MFP can be limited by the print authority.

Note that the request which requests execution of a service is not limited to the one generated from the client 201 or 202 via the network. For example, a service execution request may be issued by operating the PANEL 109 of the MFP. In this case, the MFP 100 itself generates the request shown in FIG. 6.

[Second Embodiment]

In the first embodiment, a case has been explained wherein all request packets to be received include entity files. However, the present invention is not limited to this. For example, the request packet may not include any entity file, and may describe only the storage location of the entity file by a URL or the like.

In this case, the user must have an authority to access the storage location of the entity file and to read out that file. Therefore, in order to read out the entity file and to receive a print service, "user authentication", authentication as to whether or not the user has an authority to read out the entity file, and "document file confirmation" as to whether or not the readout entity file is a document file with a print authority must be done.

Figure 7:
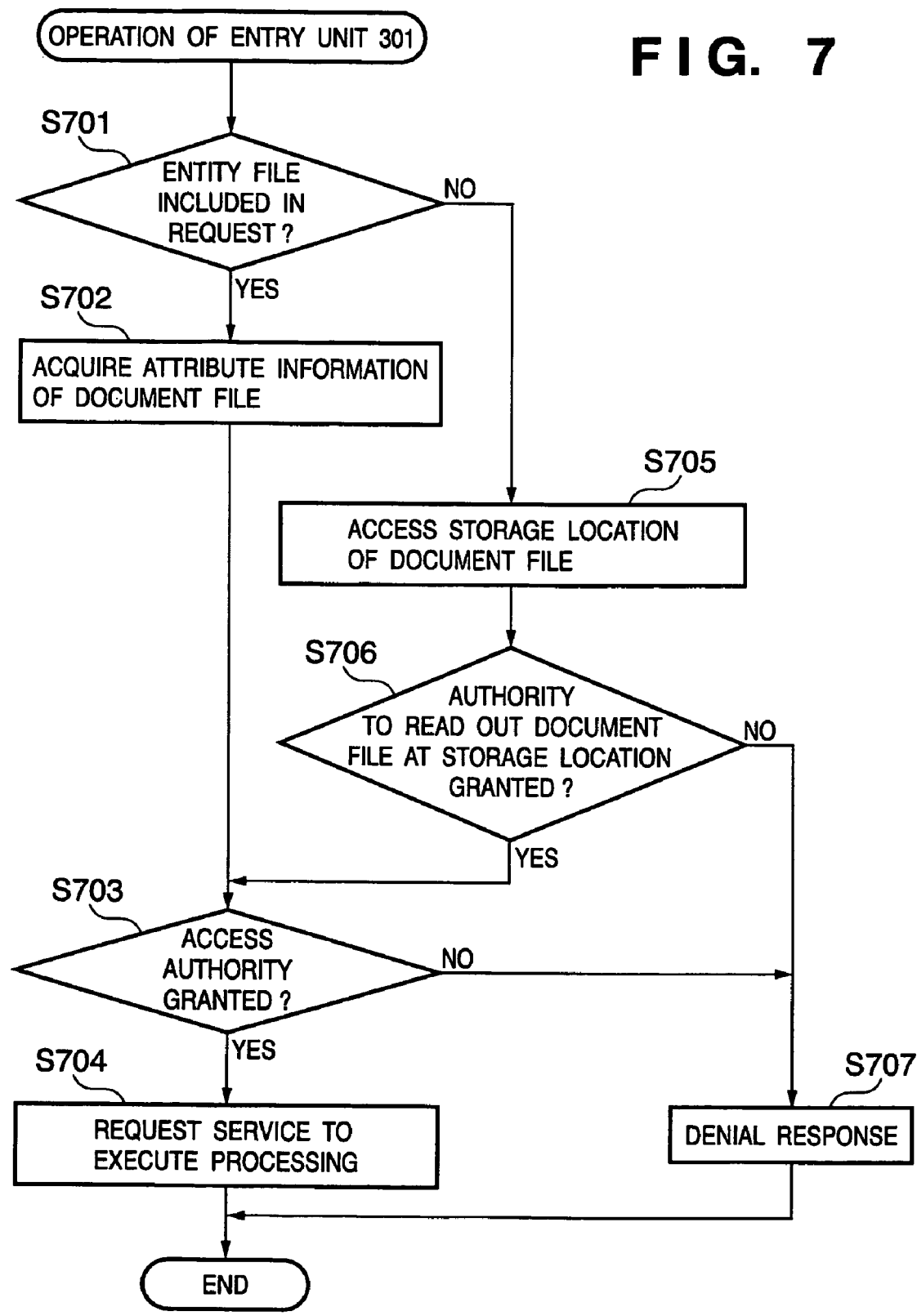
FIG. 7 is a flowchart for explaining the sequence for checking if there is an access authority to a web server to be requested.

FIG. 7 is a flowchart for explaining the sequence for checking by the entry unit 301 in FIG. 3 if the access authority to the web server to be requested is granted under the condition that the request packet includes or does not include an entity file.

The operations and determinations in FIG. 7 are made when the CPU 101 operates according to a program pre-stored in the ROM 102 in FIG. 1. During processing, the RAM 103 is used as a work area for storing, e.g., temporary variables and the like.

It is checked in step S701 if data to be processed included in a request received from the client 201 or 202 is an entity file. The entity file indicates a case wherein the data to be processed itself is included in the request packet from the client 201. On the other hand, not an entity file indicates that data to be processed is located somewhere else, e.g., on a file server (not shown), and the request packet describes a reference destination in the form of, e.g., a URL or the like.

If it is determined by interpreting the request packet received via the NIC 108 that the data to be processed is an entity file, the flow advances to step S702.

In step S702, the header field of the entity file is interpreted to acquire the file name (attribute information) of that entity file.

It is then checked in step S703 based on the user authentication result and the result of document file confirmation which is done based on the attribute information acquired in step S702 if the authentic user is granted the access authority to the web service requested for that entity file.

If it is determined in step S703 that the access authority is granted, the flow advances to step S704 to request the print service to execute processing.

On the other hand, if it is determined in step S701 that the data to be processed is not an entity file, the flow advances to step S705.

It is authenticated in step S705 if the user is granted an authority to access the storage location of the entity file and to read out the entity file. If it is determined in step S706 as a result of authentication in step S705 that the user is granted the authority to access the storage location of the entity file and to read out the entity file, the flow converges to step S703 to execute the aforementioned processing.

On the other hand, if it is determined in step S706 that the user is not granted any authority to read out the entity file or if it is determined in step S703 that the user is not granted any access authority, the flow advances to step S707.

In step S707, a message indicating no access authority (more specifically, a user authentication failure message, a message indicating that the document file to be processed is the one without a print authority, or a message indicating that the user is not granted any authority to read out the document file) is sent to the client 201.

Upon completion of the process in step S704 or S707, the processing for checking the presence/absence of an access authority by the entry unit 301 ends.

In this way, according to this embodiment, if the received request packet does not include any entity file, it is checked if the user is granted an authority to access the storage location of the entity file and to read out the entity file. If it is determined that the user is not granted any authority, a message indicating no access authority can be sent without any user authentication or the like.

[Third Embodiment]

In the first and second embodiments, the entry unit 301 has script means for performing document file confirmation. However, the present invention is not particularly limited to this. For example, the arbitrary service may have an XML script to authenticate a document file.

In the first and second embodiments, the XML script used to authenticate a document file is arranged in the node unit 204. However, the present invention is not particularly limited to this. For example, the XML script may be externally arranged.

In the first and second embodiments, the authentication service 303 is arranged in the node unit 204. However, the present invention is not particularly limited to this. For example, an external authentication service may be used upon authentication.

Figure 8:
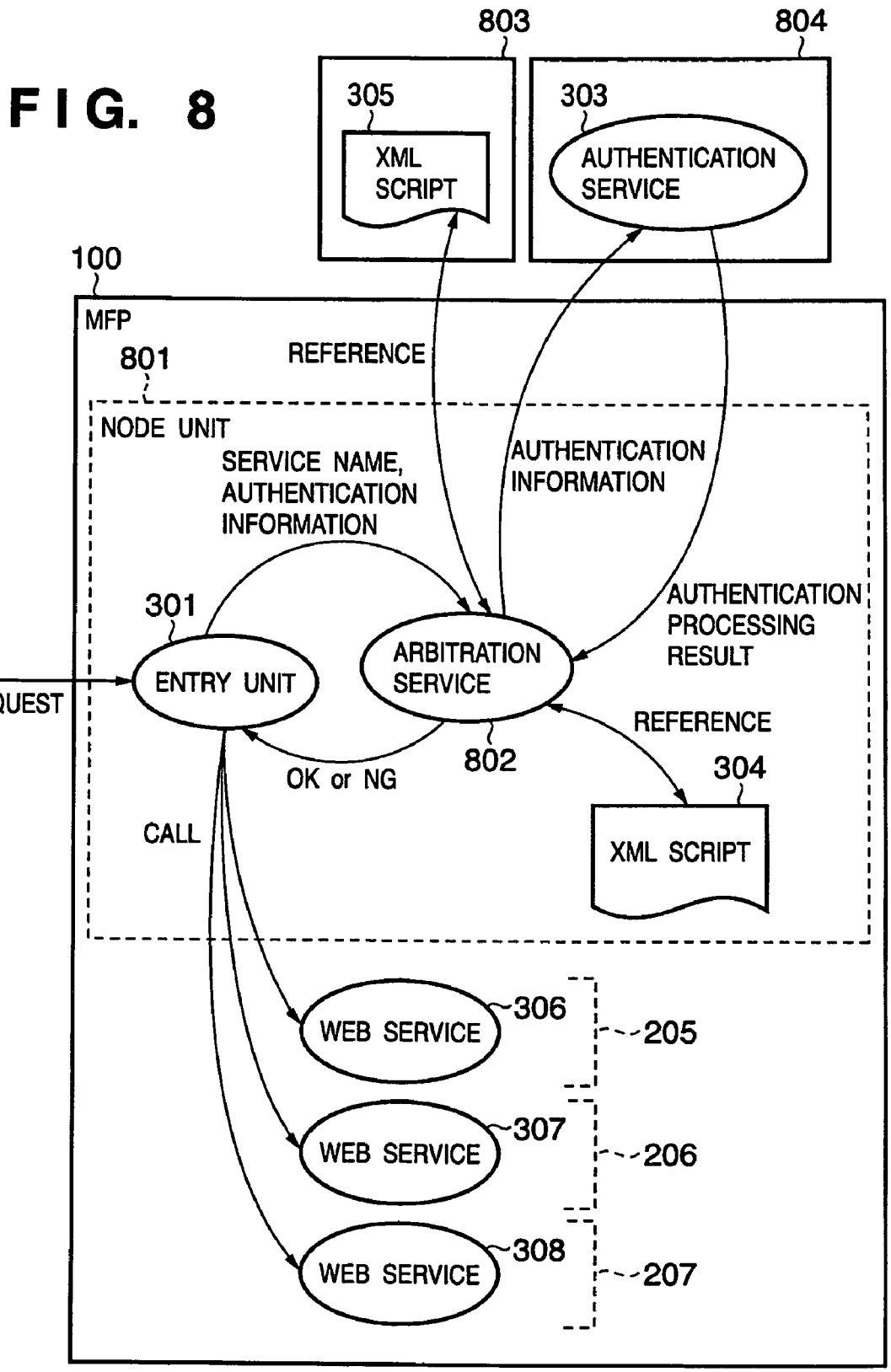
FIG. 8 is a model chart showing the flow of processing upon reception of a request by the MFP 100 according to the second embodiment of the present invention.
Figure 9:
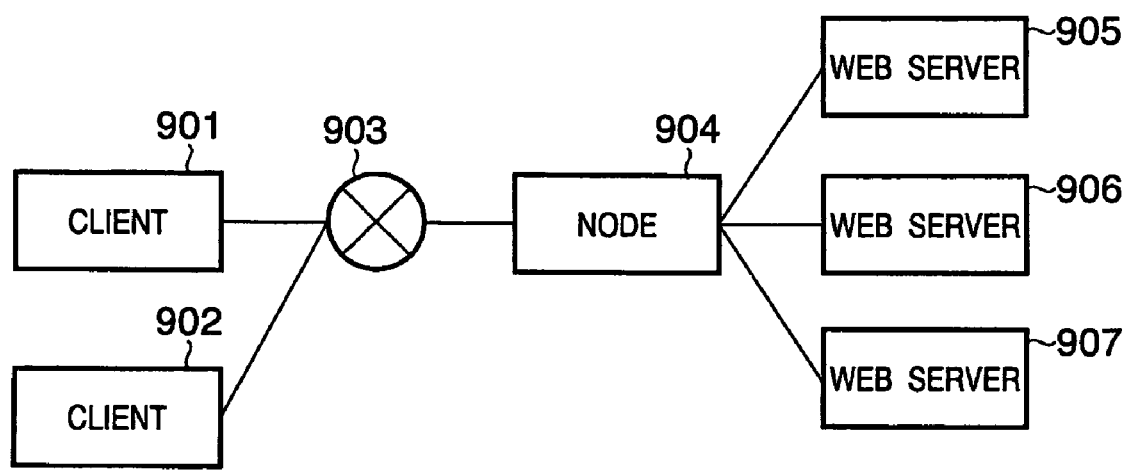
FIG. 9 is a conceptual diagram for explaining a function of alternately executing user authentication in an integrated fashion.

FIG. 8 is a model chart showing the flow of processing upon reception of a request by the MFP 100 according to the third embodiment of the present invention. The same reference numerals in FIG. 8 denote the same functional blocks as those in FIG. 3, and a detailed description thereof will be omitted.

The differences from FIG. 3 are that an arbitration service 802 has script means for confirming a document file, and the XML script 305 is stored in an external directory server 803 in place of the internal memory of the MFP 100. Also, an authentication service outside the MFP 100 is to be used. The MFP 100 is connected to the directory server 803 and authentication service 804 via the LAN 120.

Likewise, the authentication service 803 may be an external service of the MFP, which is connected to the LAN 120. Furthermore, as web services 306 to 308 provided by the MFP 100, their entities may be present outside the MFP 100.

In the first and second embodiments, the entry unit 301 checks an access authority to the web service. However, in this embodiment, the arbitration service 802 checks an access authority to the web service as in the entry unit 301 in the first or second embodiment. A detailed description thereof will be omitted since it is the same as that in the first embodiment. In case of FIG. 8, the XML script 305 in the external directory server 803 is referred to via the network.

In this way, when the XML script 305 is stored outside the MFP 100, and a plurality of MFPs can refer to an identical XML script, the policies of a plurality of devices can be centrally controlled.

[Fourth Embodiment]

In the first to third embodiments, the arbitration service and authentication service are separated, and authentication information is transmitted to a predetermined authentication service with reference to the XML script 304 to execute authentication processing. However, the present invention is not particularly limited to this. For example, the arbitration service may also serve as an authentication service.

[Fifth Embodiment]

In the first to fourth embodiments, the file name of the entity file is described in the header field of the entity file in the request packet, and the XML script 305 describes a description about the print authority, and the file names of document files without a print authority. However, the present invention is not particularly limited to this.

For example, the XML script 305 may describe the file names with a print authority, and document files with a print authority may be managed. Furthermore, the XML script 305 may describe users who can print out document files with a print authority. In this case, the entry unit 301 checks with reference to the XML script 305 if the user who has been authenticated by the authentication service is a user who can print out document files with a print authority.

Also, the header field of the entity file may describe the users and web services which can be received by these users. In this case, the entry unit 301 interprets the header field of the entity file to acquire the interpretation result as attribute information, thus checking the presence/absence of an access authority.

[Sixth Embodiment]

In the first to fifth embodiments, as a practical example of the web service, the print service has been mainly explained. However, the present invention is not particularly limited to this. For example, the present invention can be similarly applied to, e.g., a FAX service provided by the MFP. In this case, the entry unit 301 checks the presence/absence of a "FAX transmission authority" in place of the "print authority".

[Seventh Embodiment]

In the first to sixth embodiments, an apparatus which can provide a plurality of web services, the MFP has been exemplified. However, the present invention is not particularly limited to this. For example, the present invention can be applied to an information processing apparatus comprising a node unit described in the first to sixth embodiments.

[Other Embodiments]

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore to apprise the public of the scope of the present invention, the following claims are made.

This application claims the benefit of Japanese Application No. 2005-009237 filed on Jan. 17, 2005, and 2005-370899 filed on Dec. 22, 2005, which are hereby incorporated by reference herein in their entirety.

What is claimed is:

1. An information processing apparatus comprising:
   one or more units configured to perform a plurality of services, wherein the plurality of services includes at least a service regarding image input and a service regarding image output;
   a first storage unit configured to store first information which describes relationships between each of the plurality of services provided by the one or more units of said apparatus and each of a plurality of authentication services;

a second storage unit configured to store second information which represents whether each of a plurality of document files can be provided with at least one of the plurality of services;

a receiving unit configured to receive request information, which includes (a) information representing a request for performing any one of the plurality of services to a document file, and (b) authentication information of a user who issued the request;

an instruction unit configured to, in accordance with the receiving unit receiving the request information, (a) select, from among the plurality of authentication services, an authentication service which corresponds to the requested service based on the first information stored in the first storage unit, (b) notify the selected authentication service of authentication information of the user who issued the request, and (c) instruct the selected authentication service to execute authentication processing of the user; and a checking unit configured to check, based on the second information stored in the second storage unit whether or not the document file requested to be processed using the service is a document file which is permitted to be processed by the requested service, wherein in a case where said checking unit determines that the document file is permitted to be processed by the service, and authentication has succeeded as a result of the authentication processing of the user by the selected authentication service, then the service processes the document file, wherein the plurality of authentication services comprises a first authentication service and a second authentication service that is different from the first authentication service, and wherein in accordance with the receiving unit receiving a request to perform a first service of the plurality of services, the instruction unit selects the first authentication service, and in accordance with the receiving unit receiving a request to perform a second service of the plurality of services, the second service being different from the first service, the instruction unit selects the second authentication service which is different from the first authentication service.

2. The apparatus according to claim 1, further comprising:
an informing unit configured to, in a case where authentication has failed as a result of the authentication processing of the user, inform a message indicating no access authority to the service.

3. The apparatus according to claim 2, further comprising a determination unit configured to determine permission/denial of access to the document file requested to be processed using the service,
wherein in a case where said determination unit determines denial of access, said informing unit informs a message indicating no access authority to the service.

4. An information processing method in an information processing apparatus, wherein the information processing apparatus comprises one or more units configured to perform a plurality of services, a first storage unit configured to store first information which describes relationships between each of the plurality of services provided by the one or more units of said apparatus and each of a plurality of authentication services, and a second storage unit configured to store second information which represents whether each of a plurality of document files can be provided with at least one of the plurality of services, said method comprising:

a receiving step of receiving request information, which includes (a) information representing a request for performing any one of the plurality of services to a document file, and (b) authentication information of a user who issued the request;

an instruction step of in accordance with the receiving step receiving the request information, (a) selecting, from among the plurality of authentication services, an authentication service which corresponds to the requested service based on the first information stored in the first storage unit, (b) notifying the selected authentication service of authentication information of the user who issued the request, and (c) instructing the selected authentication service to execute authentication processing of the user; and a checking step of checking, based on the second information stored in the second storage unit whether or not the document file requested to be processed using the service is a document file which is permitted to be processed by the requested service, wherein in a case where it is determined in the checking step that the document file is permitted to be processed by the service, and authentication has succeeded as a result of the authentication processing of the user by the selected authentication service, then the service processes the document file, wherein the plurality of services includes at least a service regarding image input and a service regarding image output, wherein the plurality of authentication services comprises a first authentication service and a second authentication service that is different from the first authentication service, and wherein in accordance with the receiving step receiving a request to perform a first service of the plurality of services, the instruction step selects the first authentication service, and in accordance with the receiving step receiving a request to perform a second service of the plurality of services, the second service being different from the first service, the instruction step selects the second authentication service which is different from the first authentication service.

5. The method according to claim 4, further comprising:
an informing step of informing, in a case where authentication has failed as a result of the authentication processing of the user, a message indicating no access authority to the service.

6. The method according to claim 5, further comprising a determination step of determining permission/denial of access to the document file requested to be processed using the service,
wherein the informing step includes a step of informing, in a case where it is determined in the determination step that denial of access, a message indicating no access authority to the service.

7. A non-transitory computer-readable storage medium storing a control program for making a computer implement an information processing method of claim 4.

8. A non-transitory computer-readable storage medium storing a program for, in conjunction with an operating system of an apparatus, making the apparatus implement an information processing method of claim 4.

9. The apparatus according to claim 1, wherein the second information describes document files that are not permitted to be processed by the services which can be provided by said apparatus, and wherein said checking unit checks whether or not the document file requested to be processed using the service is a document file which is permitted to be processed by the service by referring to the second information.

10. An information processing apparatus comprising:

one or more units configured to perform a plurality of services, wherein the plurality of services includes at least a service regarding image input and a service regarding image output;

a first storage unit configured to store first information which describes relationships between each of the plurality of services provided by the one or more units of said apparatus and each of a plurality of authentication services;

a second storage unit configured to store second information which represents whether each of a plurality of document files can be provided with at least one of the plurality of services;

a receiving unit configured to receive request information, which includes (a) information representing a request for performing any one of the plurality of services to a document file, and (b) authentication information of a user who issued the request;

an instruction unit configured to, in accordance with the receiving unit receiving the request information, (a) select, from among the plurality of authentication services, an authentication service which corresponds to the requested service based on the first information stored in the first storage unit, (b) notify the selected authentication service of authentication information of the user who issued the request, and (c) instruct the selected authentication service to execute authentication processing of the user; and a checking unit configured to check, based on the second information stored in the second storage unit whether or not the document file requested to be processed using the service is a document file which is permitted to be processed by the requested service, wherein in a case where said checking unit determines that the document file is permitted to be processed by the service, and authentication has succeeded as a result of the authentication processing of the user by the selected authentication service, then the service processes the document file, wherein the service regarding image input is scanning and the service regarding image output is printing, and wherein the first information comprises XML information that describes, for each of the plurality of services provided by the one or more units, which authentication service among the plurality of authentication services is associated therewith and should be automatically selected, so that the first instruction unit, in accordance with (a) which one of the plurality of services provided by the one or more units of said apparatus is requested and (b) the XML information, automatically selects the authentication service among the plurality of authentication services that is associated with the one requested service of the plurality of services provided by the one or more units of said apparatus.

* * * * *